US010462987B2

(12) United States Patent
Haberman

(10) Patent No.: US 10,462,987 B2
(45) Date of Patent: Nov. 5, 2019

(54) METHOD AND APPARATUS ON MODULAR GARDENS

(71) Applicant: Shoshanah Haberman, Seattle, WA (US)

(72) Inventor: Shoshanah Haberman, Seattle, WA (US)

( * ) Notice: Subject to any disclaimer, the term of this patent is extended or adjusted under 35 U.S.C. 154(b) by 372 days.

(21) Appl. No.: 14/821,598

(22) Filed: Aug. 7, 2015

(65) Prior Publication Data
US 2017/0035007 A1 Feb. 9, 2017

(51) Int. Cl.
*A01G 27/04* (2006.01)
*A01G 9/02* (2018.01)
*A01G 27/02* (2006.01)

(52) U.S. Cl.
CPC .......... *A01G 27/04* (2013.01); *A01G 9/027* (2013.01); *A01G 27/02* (2013.01)

(58) Field of Classification Search
CPC .......... A01G 9/02; A01G 9/027; A01G 9/047; A01G 9/1423; A01G 9/1476; A01G 27/005; A01G 27/006; A01G 27/04; A01G 27/06; A01G 27/02; A01G 31/00; A01G 31/001; A01G 31/06
USPC ....... 47/59 R, 59 S, 62 C, 18, 33, 65.9, 66.5, 47/66.6, 79, 81, 86, 39, 46, 48.5
See application file for complete search history.

(56) References Cited

U.S. PATENT DOCUMENTS

| | | | | |
|---|---|---|---|---|
| 3,199,250 A * | 8/1965 | Sawyer | .................. | A01G 31/02 47/63 |
| 4,934,404 A * | 6/1990 | Destefano | .............. | A01G 25/00 137/236.1 |
| 5,458,877 A * | 10/1995 | Obayashi | ............. | A01G 31/001 424/770 |
| 5,533,303 A * | 7/1996 | Harvey | ................... | E03L 33/02 137/357 |
| 5,535,542 A * | 7/1996 | Gardner | ................. | A01G 27/04 47/18 |
| 5,842,308 A * | 12/1998 | Turner | ................. | A01G 27/005 47/48.5 |
| 8,347,927 B2 * | 1/2013 | Mitchell | ................ | A01G 27/00 141/337 |
| 8,726,568 B2 * | 5/2014 | Wilson | ................... | A01G 31/00 47/62 R |

(Continued)

FOREIGN PATENT DOCUMENTS

GB 2107962 A * 5/1983 ............. A01G 27/04

OTHER PUBLICATIONS

English-language Abstract of KR 2010092650 A.*

(Continued)

*Primary Examiner* — Lisa L Tsang
(74) *Attorney, Agent, or Firm* — Gleam Law, PLLC; Neil Juneja

(57) ABSTRACT

A modular gardening system characterized by a rain collection system, one or more planters, a water distribution system, a growing medium, and an optional bench suitable for plant growth. The water distribution system is capable of collecting, storing, and distributing water to the plants. The modular gardening system further comprises water retention baskets with a wicking system. The method of modular gardening utilizes the modular gardening system and determines the proper plant species, growing medium, and habitat requirements while adjusting the modular gardening system for the proper application.

19 Claims, 23 Drawing Sheets

(56) References Cited

U.S. PATENT DOCUMENTS

| | | | | |
|---|---|---|---|---|
| 2006/0070299 A1* | 4/2006 | Furumura | ............... | A01G 9/02 |
| | | | | 47/69 |
| 2010/0095588 A1* | 4/2010 | Hashimoto | ............ | A01G 9/027 |
| | | | | 47/82 |
| 2012/0174481 A1* | 7/2012 | Toro | ......................... | A01G 9/02 |
| | | | | 47/86 |
| 2015/0156975 A1* | 6/2015 | Gould | ............... | B29C 66/73172 |
| | | | | 239/565 |
| 2015/0181818 A1* | 7/2015 | Bonn | ....................... | A01G 9/02 |
| | | | | 47/79 |
| 2016/0081283 A1* | 3/2016 | Pierce | .................... | A01G 27/06 |
| | | | | 47/80 |
| 2016/0120139 A1* | 5/2016 | Lee | ....................... | A01G 27/06 |
| | | | | 47/81 |

OTHER PUBLICATIONS

Digging, "Visit to Big Red Sun's reopened boutique nursery in Austin," available at https://www.penick.net/digging/?p=14257 (Year: 2011).*

* cited by examiner

METHOD AND APPARATUS ON MODULAR GARDENS

BACKGROUND

More than half of the world's population lives in cities, a percentage rapidly increasing over time. Though numerous regions such as the United States is often known for its characteristic suburban sprawl, urbanization and densification are increasing in the development of all region in the world. Using the United States as an example, the 2007 economic census found that 252 million Americans (84% of all Americans) lived in metropolitan areas up from 78 percent in 1990, and less than 40 percent in 1900. The least dense, outer suburban counties—exurbs and emerging suburbs—registered extremely low growth rates in 2010 and 2011, continuing a downward trajectory established in the late 2000s. In contrast, growth in cities and dense inner suburbs is increasing rapidly. The nation's largest core cities grew by 17 percent between 1990 and 2007, adding 6.8 million new residents. These trends are strongly accentuated in China, where 550,000,000 people currently reside in urban environments with 100,000,000 additional urban residents expected by 2020.

Urban densification provides numerous benefits to the population. It has the potential to limit the environmental impact of population growth by reducing land use, lowering emissions due to mass transit, producing more efficient resource allocation and streamlining government services, to name a few. The economic benefits to the urban citizens are also plentiful, including higher per capita income and greater opportunities. However, a 1992 study indicated that density was a consistent factor that reduced satisfaction with the urban environment. Studies generally attribute this to the social stresses of urban life, but there are indications that the physical environment plays a role as well. Dense rental housing often lacks plants and greenery when compared to areas dominated by single-family homes. In addition, apartment renters are far less likely than homeowners to have access to private land. A 2013 study of the DC tree canopy showed residents of neighborhoods dominated by rental housing tended to have less disposable income, but also did not own the green spaces around their homes.

Multiple studies show a connection between horticulture and human mental and physical health especially with regard to stress related disorders. In addition, a 2015 study found that having ten or more trees within one block of one's residence produced similar health benefits to increased income or younger age. In addition, the study found tree coverage also resulted in reported benefits to blood pressure, obesity, heart disease, and diabetes. This study can be extrapolated to show that green space and plants in general are beneficial to those living in urban environments.

Generally, designers approach the problem of alienation from the land in urban settings by designing communal green spaces. The resulting parks, urban agriculture projects, community gardens and parklets are essential to urban life. However, these efforts do not provide urban renters with a private green space to call their own. Even community gardens, where people can rent private plots tend to lack privacy and proximity to homes. In addition, they are also hard to come by. For instance, the community gardens in Seattle, called the P-Patch has a 1-2 year waiting list with 4% of the waitlist waiting four years for a gardening plot.

For many renters, the lack of private land is part of the appeal of a rental. No land means no maintenance. For others, access to planting space would make urban life far more palatable. Multiple studies show a connection between horticulture and human mental and physical health especially with regard to stress related disorders.

Urban dwellers often do have convenient space for personal gardens. Patios and balconies are often common in urban rental, apartments, condos, and smaller homes. However, these areas are generally underutilized or ignored as potential green spaces.

Garden stores are not often in urban centers. Gardeners who remain interested in planting a patio or balcony also face limited access to garden retail stores. Few garden supply retailers are willing to establish stores in city centers. As a result, urban renters must order supplies online or go to the suburbs to buy them. Renters who choose to live in walkable communities because they do not have a car have very limited options. This explains why market research shows renters, as a whole, are far less likely to invest in gardening products and supplies than homeowners.

In addition, urban environments are difficult to grow in. Urban areas may be very hot with direct sunlight & reflected sunlight & concrete heat or may be too shady for most plants due to building heights and proximity. Balconies rarely get rainwater, necessitating water transport from the apartment kitchen or bathroom in a watering can.

However, while densification is increasingly a feature of the urban environment, it has distinct environmental consequences that directly affect the plant palette of an urban renter. Dense areas produce heat islands as they store solar energy in the urban fabric during the day and release this energy into the atmosphere at night. The process of urbanization replaces the cooling effect of vegetated surfaces by imperviously engineered surfaces with different thermal properties. Furthermore, anthropogenic sources (e.g. central heating systems, air conditioning, transport, industrial processes) emit heat directly into the urban area, while buildings and infrastructure increase surface roughness that can reduce wind speeds, convective heat loss and evapotranspiration. Warm, still days reduce air quality because high temperatures and ultraviolet light stimulate the production of photochemical smog, ozone and other compounds from traffic and industrial emissions and plants.

While urban dwellers can purchase pots and limited systems for growing plants on balconies and patios, there lacks a cohesive system for use in varied urban environments. What is needed is a modular growing system for use in the varied urban environments that is capable of supporting and providing for a plurality of plants.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a modular garden system is provided. The modular garden system generally includes a rainwater collection device, including a tray for collecting rainwater, and a gutter configured to gather and distribute rainwater from the tray; a support structure connected to the rainwater collection device, the support structure comprising a water storage container fluidly connected to the gutter; and a planter, including a distribution trough fluidly connected to the water storage container of the support structure, and a wicking device in fluid communication with the distribution trough, the wicking device configured to draw and distribute rainwater from the trough to a growing medium in the planter.

In accordance with another embodiment of the present disclosure, a method of modular gardening, using a modular garden system, is provided. The method of modular gardening generally includes determining habitat requirements based on the criteria of available space, exposure to sunlight, humidity, temperature, and/or rainfall; selecting one or more plant species appropriate for the habitat requirements; selecting a growing medium based upon the habitat requirements and selected plant species; mounting the rainwater collection device such that the tray is positioned to collect rainwater and the gutter gathers the rainwater for distribution to the water storage container; fluidly connecting the planter to the water storage container such that the distribution trough in the planter is filled with collected rainwater; and planting the selected plant species in the planter filled with the growing medium, wherein the rainwater is distributed to the growing medium by the wicking device, thereby providing rainwater to the plant species.

In accordance with any of the embodiments described herein, the modular garden system may include an intermediate support shelf mounted above the distribution trough, which supports growing medium tailored to this modular garden system, and a basket supported by the support shelf, wherein the wicking device may pass upward through the basket.

In accordance with any of the embodiments described herein, the modular garden system basket in the planter may be filled with silica stone to allow rainwater to be retained in the basket and allow excess rainwater to drain into the distribution trough.

In accordance with any of the embodiments described herein, the wicking device may be formed from a hydrophilic material.

In accordance with any of the embodiments described herein, the hydrophilic material may be selected from the group consisting of cotton, nylon, polyester, open celled foam, tricot, rayon, polypropylene, thermoplastic polymers, and synthetic fibers.

In accordance with any of the embodiments described herein, the wicking device generally includes an internal support wire configured to allow the wicking device to be formed in a position and maintain said position.

In accordance with any of the embodiments described herein, the support structure generally includes a bench projecting laterally from a side of the support structure, wherein the bench may be configured to support a user in a seated position.

In accordance with any of the embodiments described herein, the tray of the rainwater collection device may be configured to cover at least a portion of the bench for shielding the user from rain.

In accordance with any of the embodiments described herein, the planter may be configured to fluidly connect to at least a second planter, the second planter may be configured to receive rainwater from an outlet in the distribution trough.

In accordance with any of the embodiments described herein, the second planter may have a side shaped to correspond to the shape of a side of a separate planter such that the second planter can nest adjacent to the separate planter.

In accordance with any of the embodiments described herein, the water storage container may be fluidly connected to a rainwater barrel for further rainwater storage.

In accordance with any of the embodiments described herein, the tray of the rainwater collection device may be mounted at an angle of between about 1° and 15° from horizontal such that rainwater flows under gravity into the gutter.

In accordance with any of the embodiments described herein, the components of the modular garden system may be configured to be flat packaged for shipping.

In accordance with any of the embodiments described herein, wherein the method of modular gardening may generally include fluidly connecting a second planter to an outlet of the distribution trough such that rainwater is distributed to the second planter.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
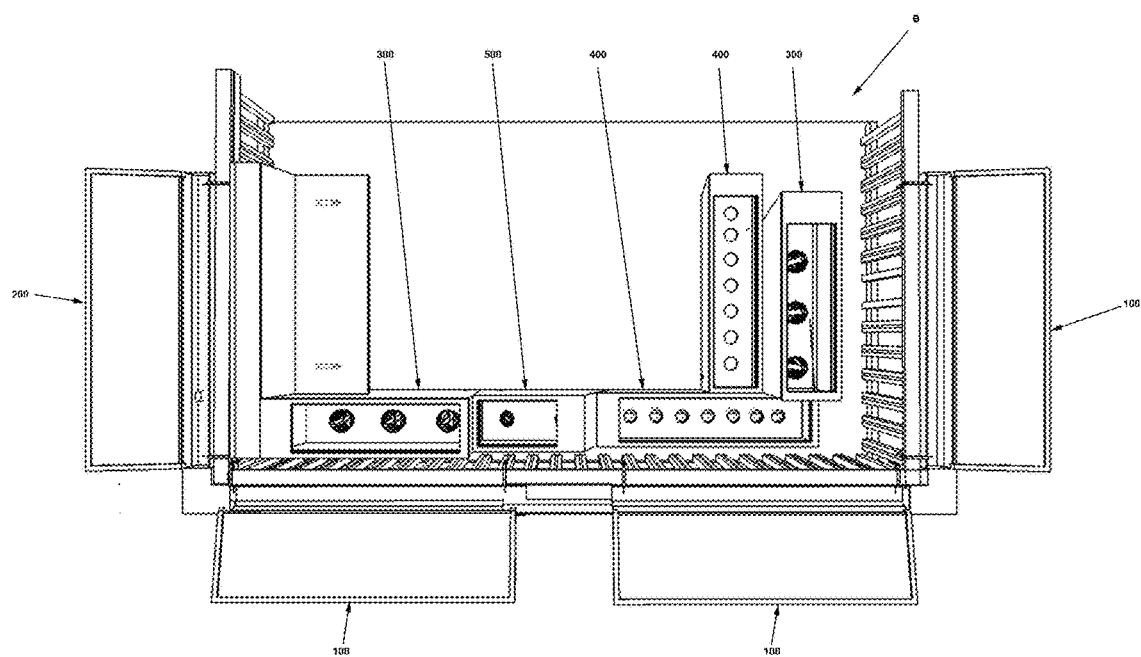
FIG. 1 is a perspective top view of a balcony containing the modular garden system formed in accordance with various embodiments of the present disclosure.

"flat-packable" in this context refers to A piece of furniture or other equipment that is sold in pieces packed flat in a box for easy transport and is assembled by the buyer.

Description

The detailed description set forth below in connection with the appended drawings, where like numerals reference like elements, are intended as a description of various embodiments of the disclosed subject matter and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "back," "upward," "downward," "right hand," left hand," "in," "out," "extended," "advanced," "retracted," "proximal," "distal," "central," etc. These references and other similar references in the present application are only to assist in helping describe and understand the present invention and are not intended to limit the present invention to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc.

Embodiments of the present disclosure are generally directed to modular garden systems such as the type that would be installed on a deck or balcony. In general, examples of the modular garden systems described herein are capable of attaching to a mounting surface, collecting rainwater, and distributing rainwater to one or more planters containing planted species. The embodiments illustrated in the FIGURES have been designed for use with the modular garden systems designed herein. However, the embodiments of the present disclosure may also be used in other types of modular garden applications which are also within the scope of this disclosure.

Referring initially to FIG. 1, a balcony B is shown containing one embodiment of the modular garden system, illustrated as composed of a rainwater collector 100, a rainwater collector with bench attachment 200, a large planter 300, a small planter 400, and a medium planter 500. The components of the system are in fluid communication through various fluid attachment devices as explained in more detail below. The rainwater is collected at the rainwater collectors 100 and 200 and is distributed to the planters 300, 400, and 500. The components shown in FIG. 1 are modular and are suitably used in various combinations, as described in more detail below. The embodiment shown in FIG. 1 is an illustrative configuration. Additionally, the balcony B shown in various FIGURES forms no part of the claimed invention, and is simply used for illustration purposes.

Figure 2:
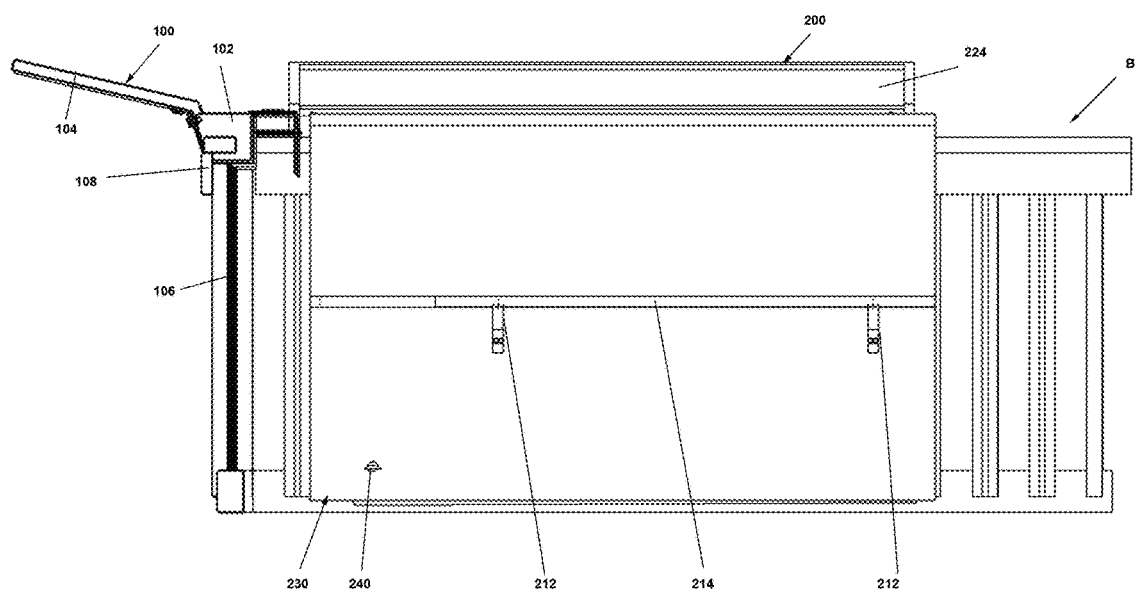
FIG. 2 is a perspective side view of the modular garden system of FIG. 1, showing a side view of a rainwater collector formed in accordance with one embodiment of the present disclosure and a front view of a rainwater collector with a bench attachment formed in accordance with another embodiment of the present disclosure.
Figure 3:
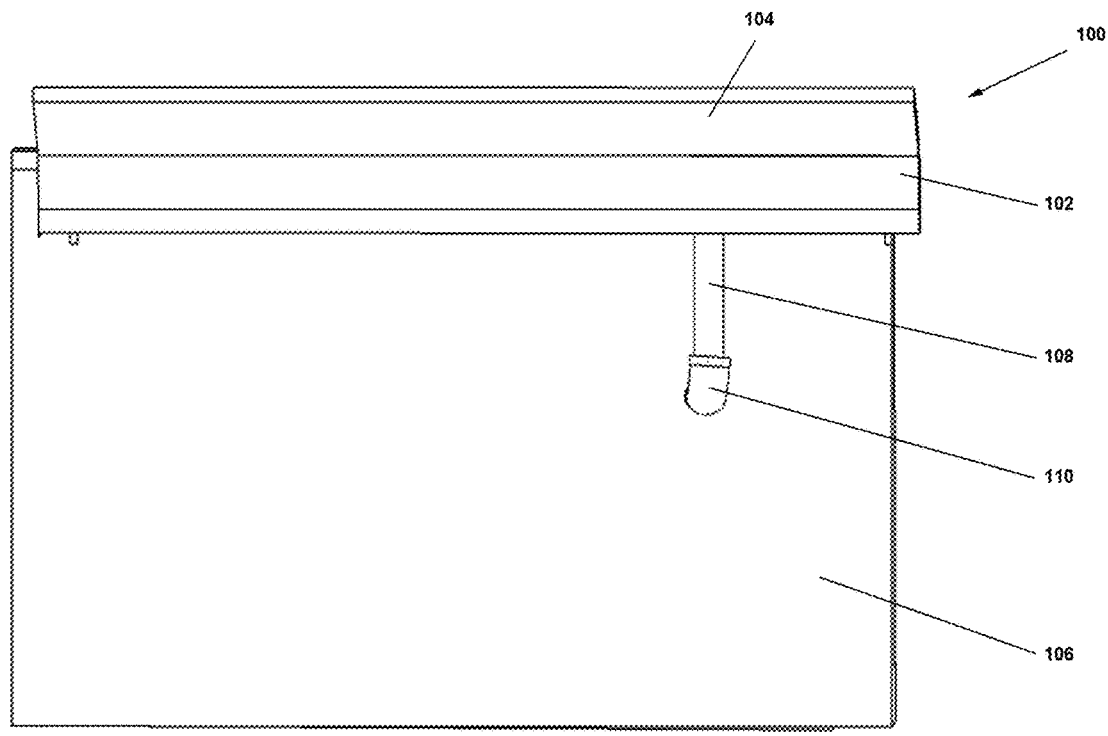
FIG. 3 is a rear elevation view of the rainwater collector of FIG. 2.
Figure 4:
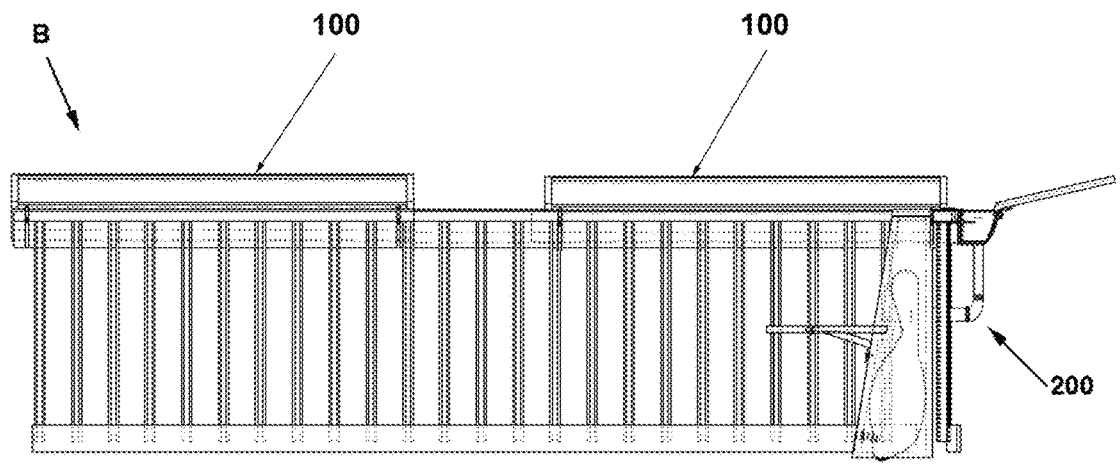
FIG. 4 is a perspective front view of the balcony containing the modular garden system of FIG. 1, showing a side cutaway view of the rainwater collector with a bench attachment of FIG. 2.
Figure 5:
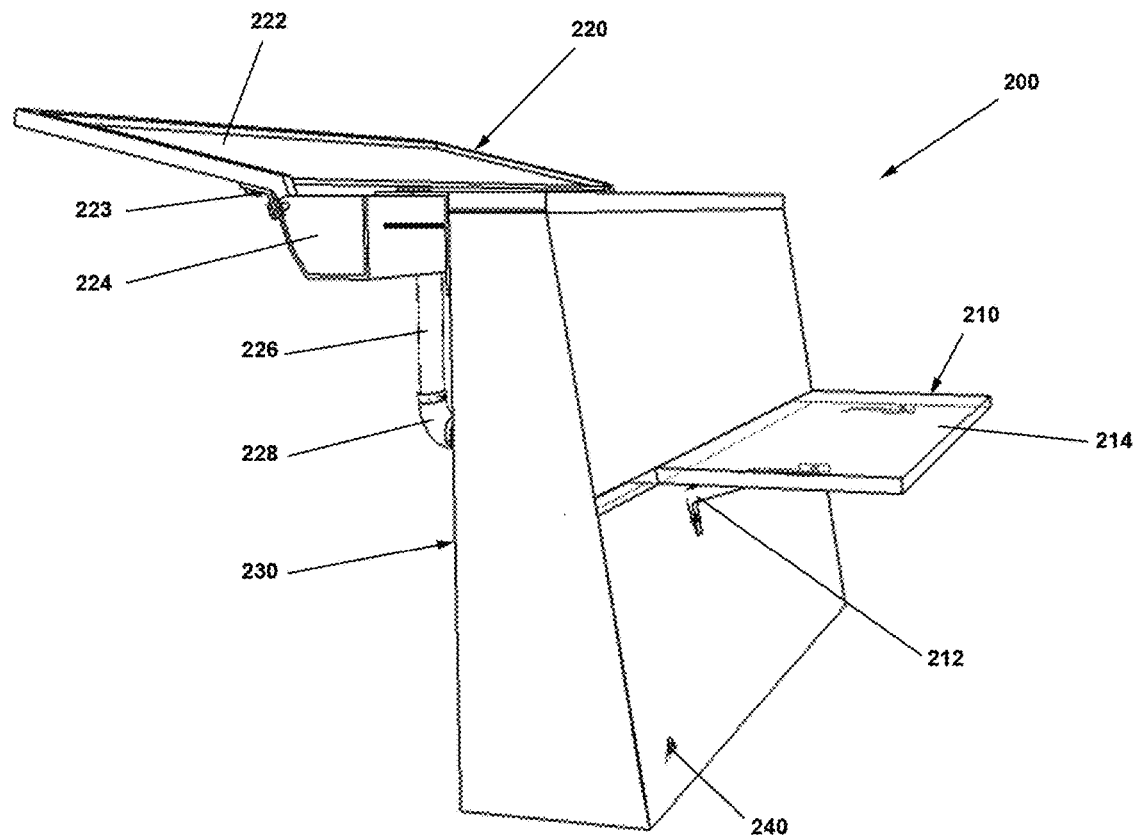
FIG. 5 is an isometric view of the rainwater collector with a bench attachment of FIG. 2.

Referring to FIGS. 2 through 7, the rainwater collector 100 and the rainwater collector with bench attachment 200 are shown. Referring initially to FIG. 2, the rainwater collector 100 is illustrated as composed of a rainwater collection tray 104, a gutter 102 for gathering and distributing the rainwater, a gutter downtube 108, and a support structure 106. The gutter downtube 108 feeds rainwater into the planters 300, 400, and 500, or into a storage tank (not shown). As shown in FIG. 3, the rear view of the rainwater collector 100 also includes a gutter downtube elbow 110 for further directing the rainwater into the support structure 106 and ultimately to the various components of the system.

Referring back to FIG. 2, the rainwater collector with bench attachment 200 is illustrated as composed of a gutter 224 for gathering and distributing rainwater; a bench assembly 210, including a bench 214 to accommodate a seated user, and bench supports 212; a water outlet 240 configured to distribute water to other components of the system; and a support structure 230. Now turning to FIG. 5, additional components of the rainwater collector with bench attachment 200 include a rainwater collection assembly 220 with a collection tray 222, and the gutter 224. The collection tray 222 is mounted to the gutter 224 with a bracket 223. In some embodiments the bracket 223 is formed at a fixed angle such that the collection tray 222 is mounted at a specific angle from horizontal to promote gravity flow of the collected rainwater. In other embodiments, the bracket 223 is adjustable to any angle such that the collection tray 222 can be adjusted to suit the environmental conditions and the configuration of the system. In some embodiments, the angle of the collection tray 222 is suitably between 1° and 15° from horizontal. In other embodiments, the angle of the collection tray 222 is any angle suitable for the application.

Figure 6:
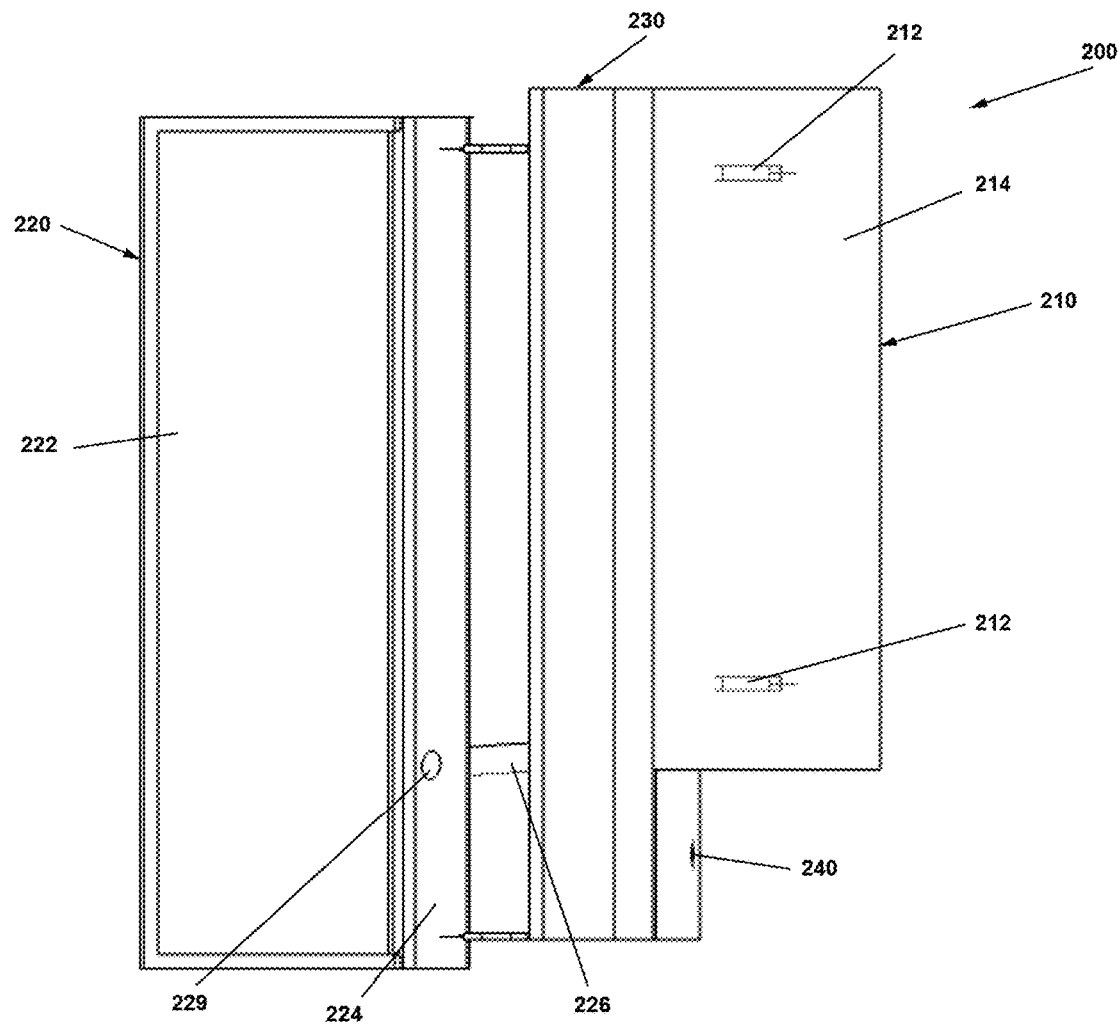
FIG. 6 is a top view of the rainwater collector with a bench attachment of FIG. 2.
Figure 7:
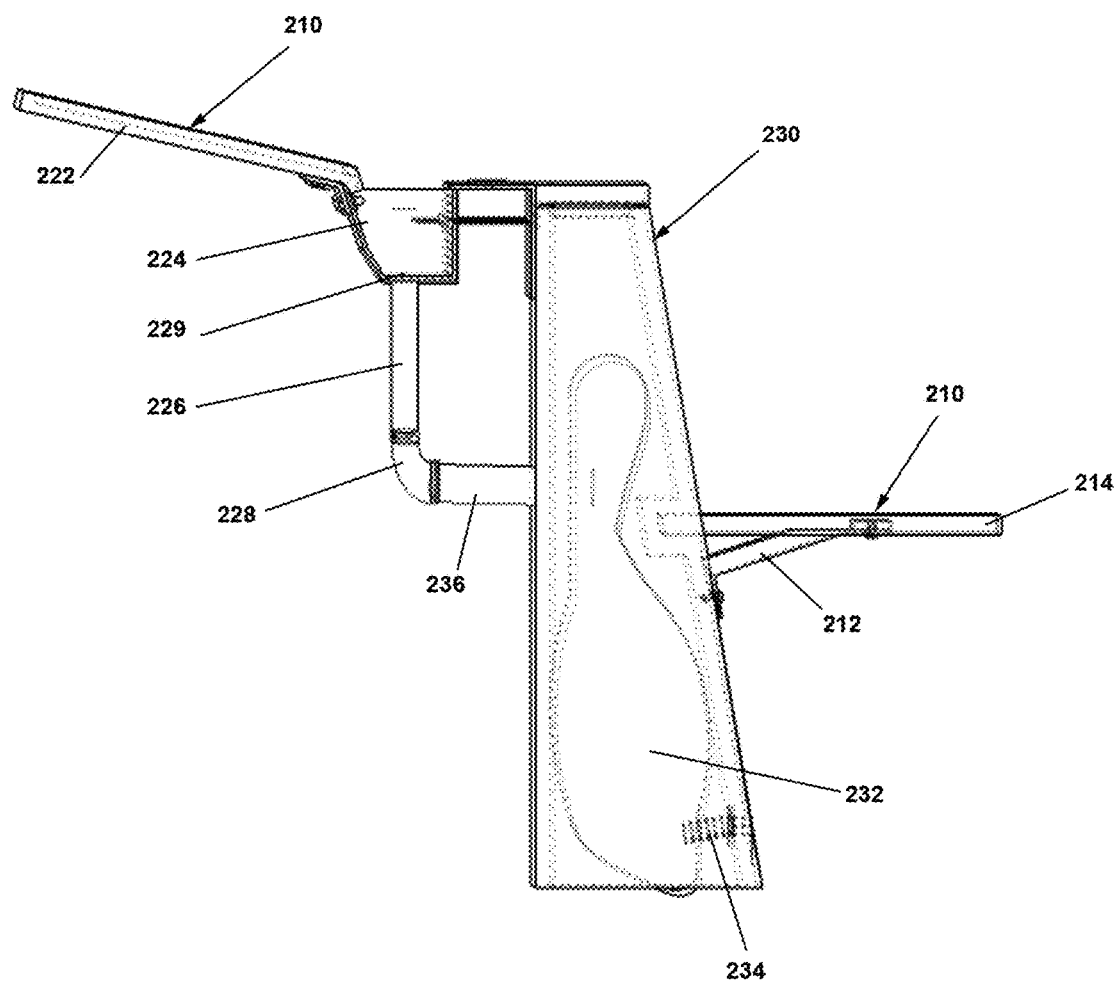
FIG. 7 is a cross-sectional side elevation view of the rainwater collector with a bench attachment of FIG. 2.
Figure 8:
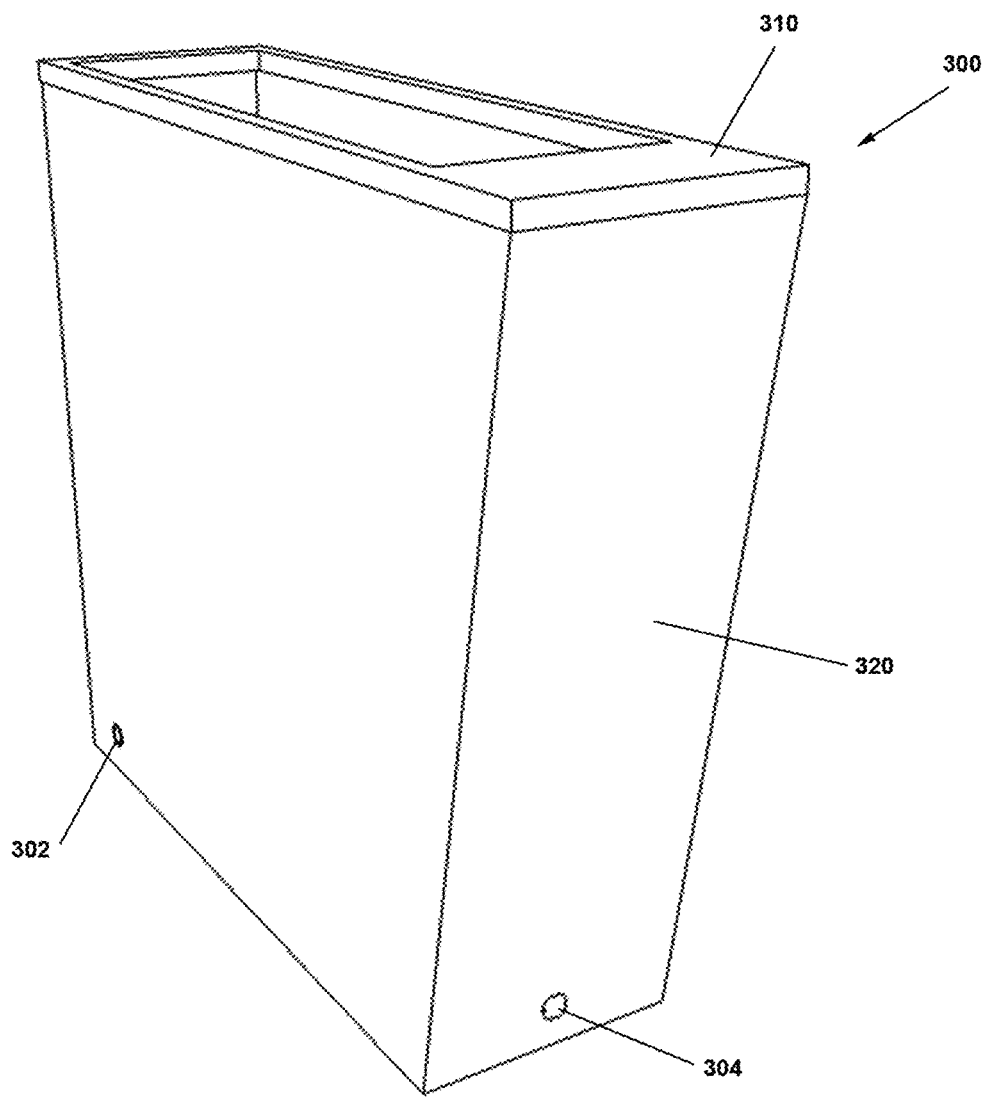
FIG. 8 is an isometric view of a planter formed in accordance with another embodiment of the present disclosure.

The gutter 224 drains through the gutter drain opening 229 (see FIG. 6), into the gutter downtube 226, and is redirected by gutter downtube elbow 228 into the water storage container 232 (see FIG. 7). In some embodiments, an extension tube 236 can be suitably used to direct the rainwater into the water storage container 232 (see FIG. 7).

In some embodiments, the water storage container 232 has a connector tube 234 to direct the rainwater from the water storage container 232 to the water outlet 240.

As shown in FIG. 6, in one embodiment of the present disclosure, the bench 214 is offset to one side of the support structure 230. In other embodiments, the bench 214 is centered on the support structure 230. In further embodiments, the bench 214 runs the full width of the support structure 230.

Figure 9:
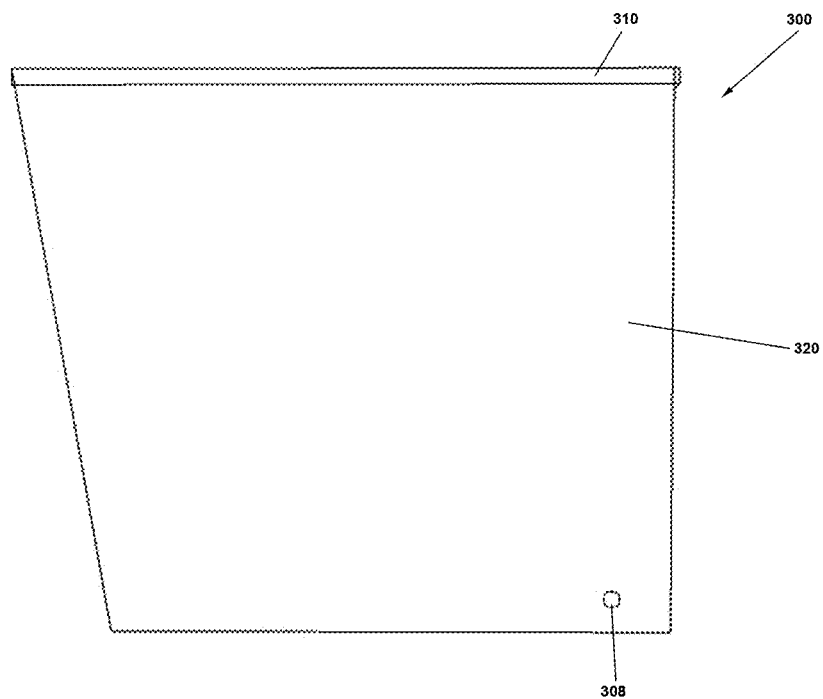
FIG. 9 is a side elevation view of the planter of FIG. 8.

Now referring to FIGS. 8 through 12, a large planter 300 is shown. The large planter 300 is illustrated as composed of a planter housing 320, a top cover 310, a water inlet port 304, and a water outlet port 302. The inlet and outlet ports are labeled for illustration purposes only, and in other embodiments can be reversed while still performing the same functions. As shown in FIG. 9, an additional water outlet port 308 is used in some embodiments to connect to other planters or components of the system. If the planter has no other connection, the ports 302 and 308 are suitably capped off as to not drain the rainwater out of the distribution trough 306 (see FIG. 10).

Figure 10:
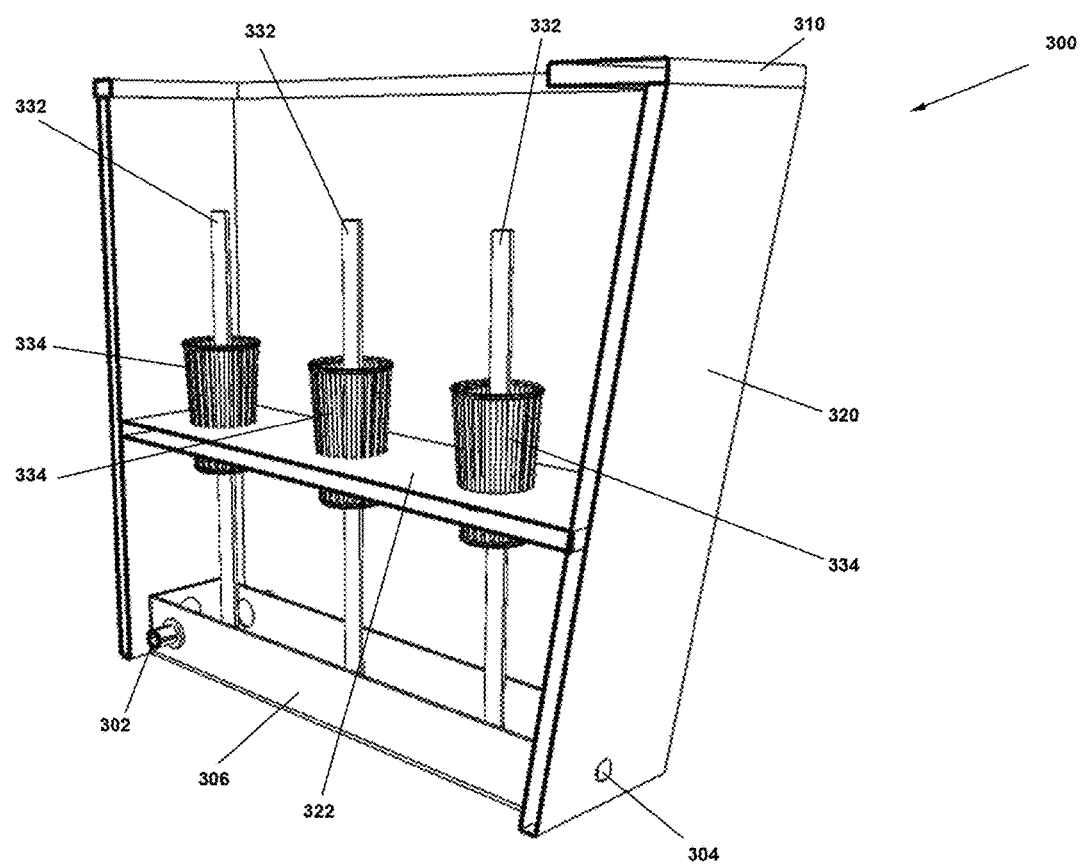
FIG. 10 is a cross-sectional front, side perspective view of the planter of FIG. 8.
Figure 11:
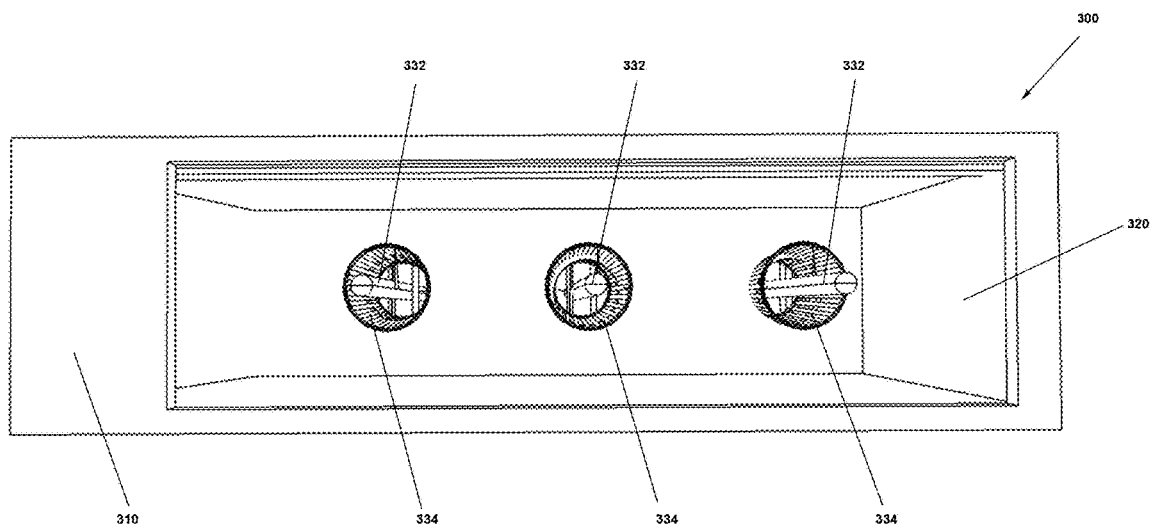
FIG. 11 is a top view of the planter of FIG. 8.
Figure 12:
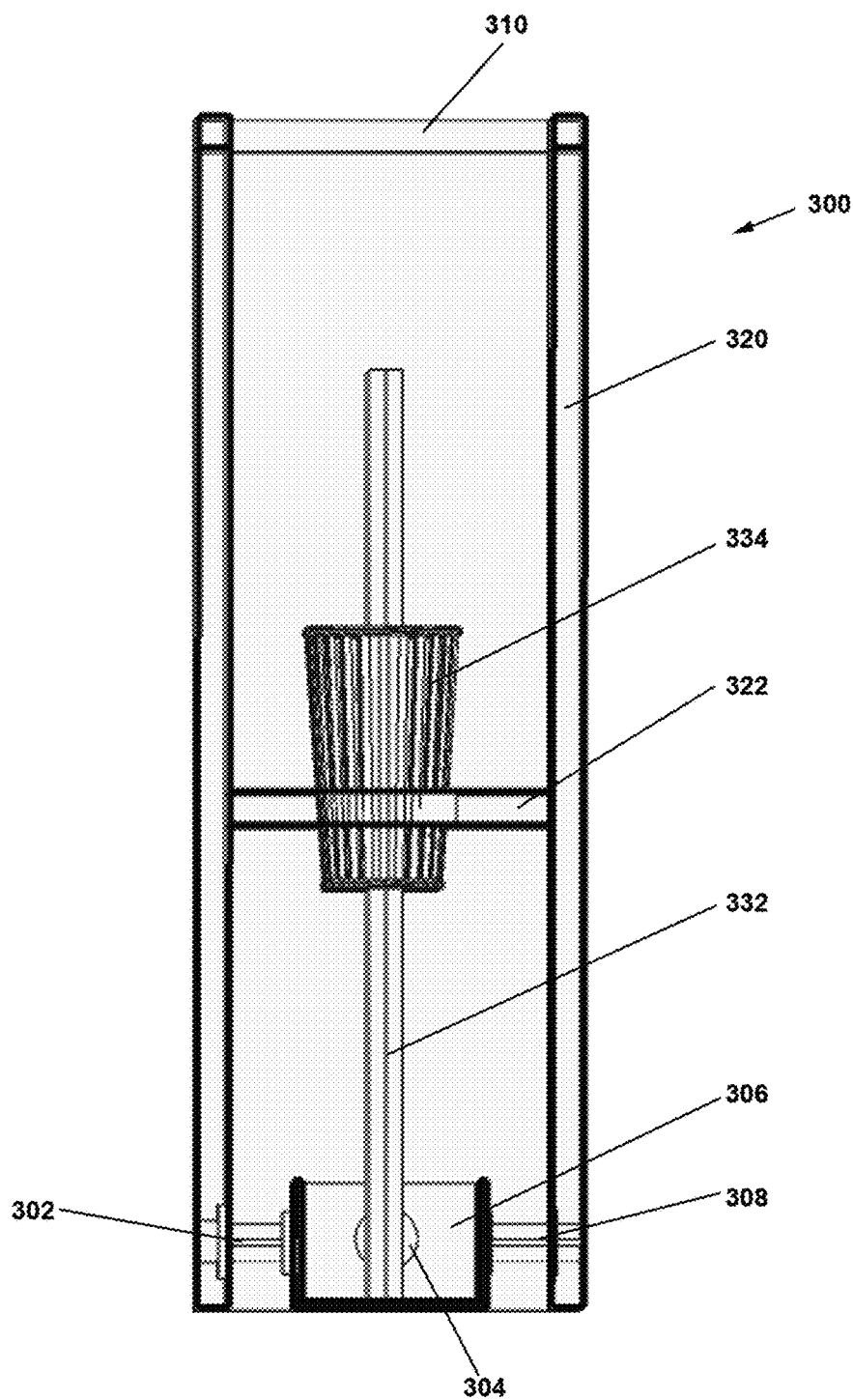
FIG. 12 is a cross-sectional front elevation view of the planter of FIG. 8.

The interior of the large planter 300 is shown in FIGS. 10 through 12. The large planter 300 includes a distribution trough 306 which contains rainwater supplied by the rainwater collector 100 or the rainwater collector with bench attachment 200. The distribution trough 306 includes the aforementioned water ports 302, 304, and 308. The wicking device 332 is in fluid communication with the distribution trough 306. The wicking device 332 is suitably made from a hydrophilic material such that water is pulled upward from the distribution trough 306 and redistributed at least to the growing medium 350 (see FIG. 18). In some embodiments, the wicking device 332 is made from a cloth of cotton or synthetic fibers. In other embodiments, the wicking device 332 is made from nylon, polyester, open celled foam, tricot, rayon, polypropylene, and thermoplastic polymers. Still, in further embodiments, the wicking device 332 is made from any suitable hydrophilic material.

The growing medium 350, 450, and 550 (see FIG. 18) is suitably 75%-90% inorganic and contains combination of expanded clay, expanded shale pumice, or crushed clay tiles with vermiculite or perlite and organic compost. The growing medium 350, 450, and 550 suitably contains no soil as soil contains silt and will block water drainage, decreasing performance of the modular garden system. The growing medium 350, 450, and 550 is also suitably pH neutral or as prescribed by the selected plant species. In other embodiments any suitable growing medium 350, 450, or 550 may be used with the modular garden system of the present disclosure. In some embodiments, the growing medium contains between 10% and 30% clay, between 30% and 50% vermiculite, between 20% and 40% cocopeat, and the remainder including compost. In other embodiments, the growing medium is comprised of about 20% fine grade expanded clay, about 40% vermiculite, about 30 cocopeat, and about 10% leaf mulch compost.

As shown in FIG. 10, the wicking device 332 travels upward through an intermediate support shelf 322 containing one or more baskets 334. In one embodiment, the basket 334 is configured to hold silica stone 360 (see FIG. 18) for water retention and to facilitate drainage of excess rainwater into the distribution trough 306. In other embodiments, any suitable device is used to allow drainage of the system. Due to materials with lack of structure in the wicking device 332, in some embodiments, the wicking device 332 includes an internal support wire (not shown) to allow the wicking device 332 to be formed in a position and maintain said position.

The large planter 300 is suitably made of numerous materials as would be obvious to one of ordinary skill in the art. In some embodiments, the components of the large planter 300 are constructed of plastic. In other embodiments, the components of the large planter are constructed of metal. In some embodiments, the large planter 300 includes drainage holes (not shown) or other mechanisms for directing water out of the planter 300 in an organized manner to prevent overflow.

In some embodiments, the large planter 300 includes filler (not shown) at the bottom of the planter housing 320 to fill the space, reduce weight, and improve drainage and water retention. The filler is suitably composed of crushed aluminum cans, plastic milk jugs, non-biodegradable packing peanuts, etc. In some embodiments, the filler would fill about ⅓ of the bottom of the planter housing 320. The filler occupies space while allowing water to pass though and provides further space for roots to grow.

Figure 13:
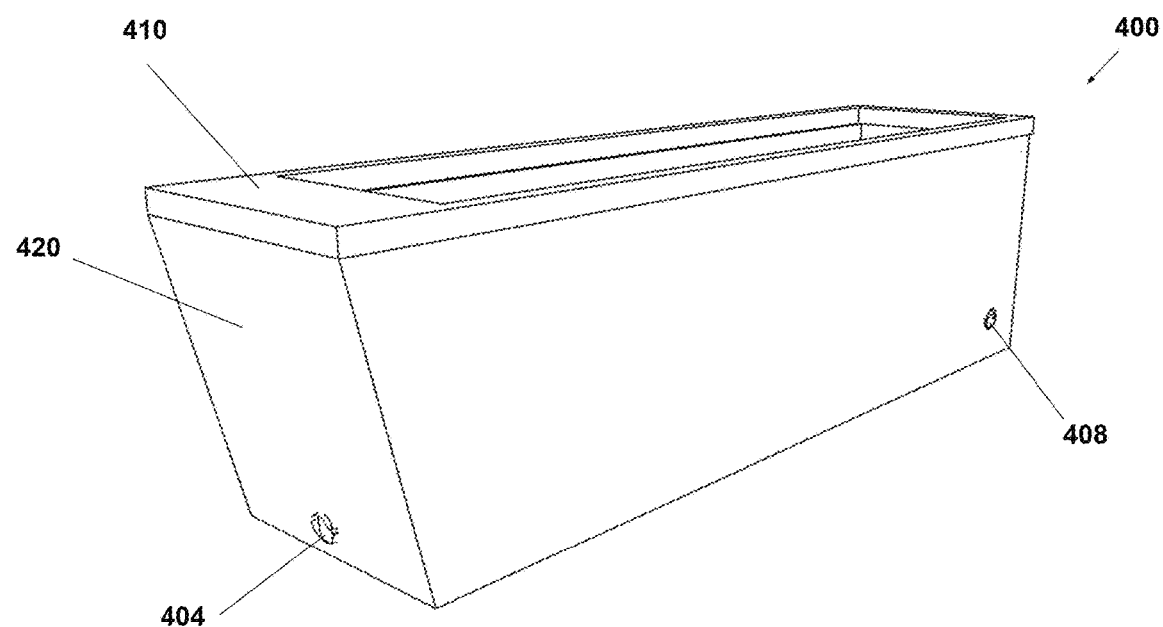
FIG. 13 is an isometric view of a planter formed in accordance with another embodiment of the present disclosure.
Figure 14:
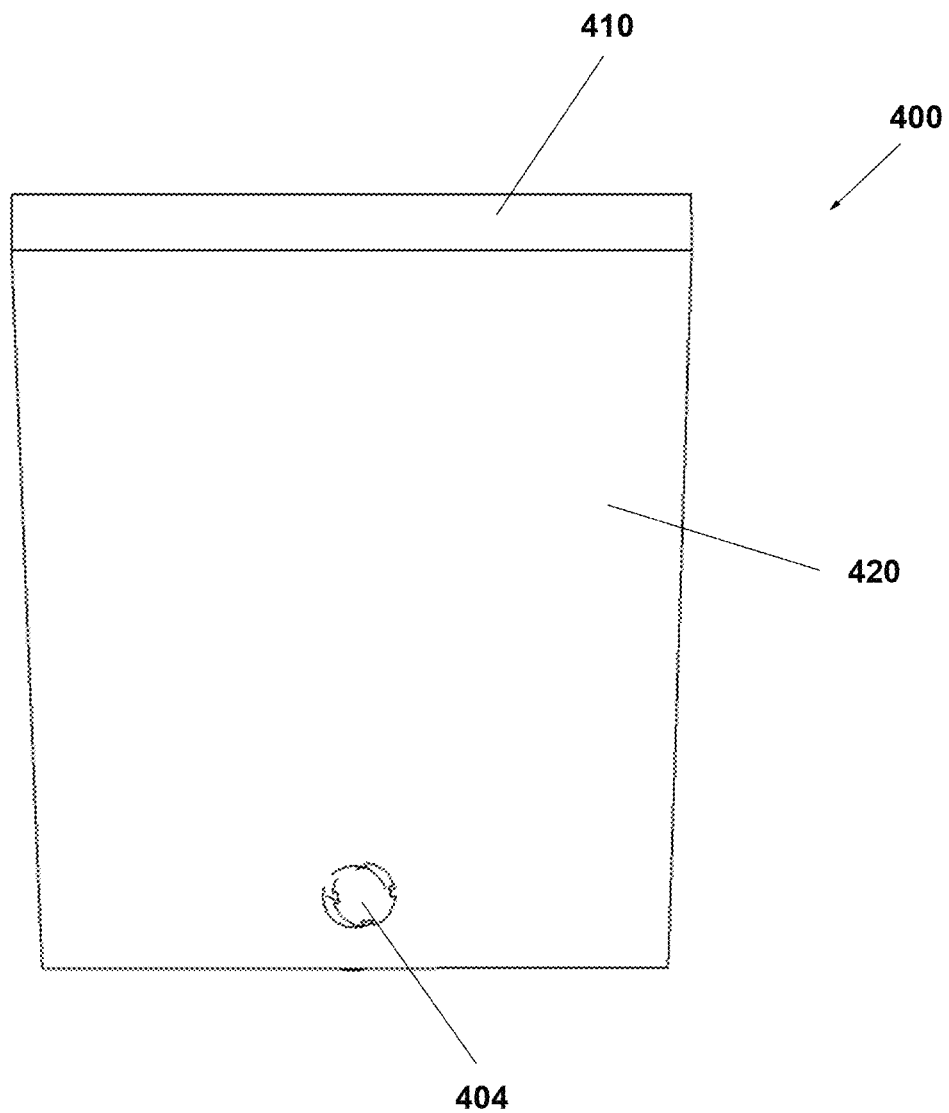
FIG. 14 is a front view of the planter of FIG. 13.
Figure 15:
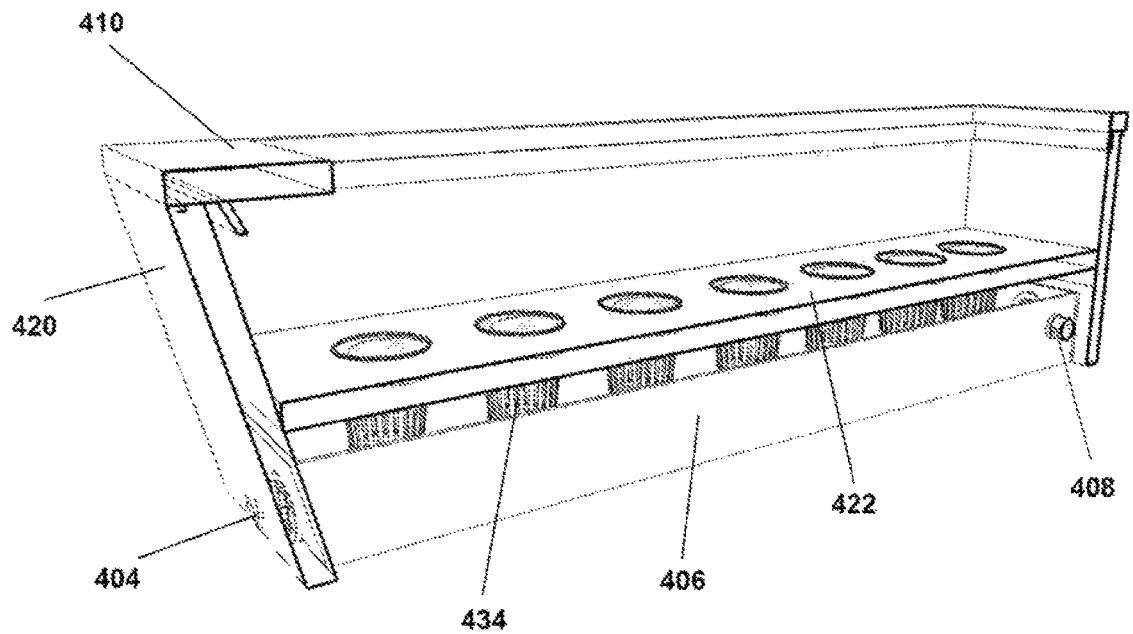
FIG. 15 is a cross-sectional front, side perspective view of the planter of FIG. 13.

Now referring to FIGS. 13 through 15, a small planter 400 is shown. The components of the small planter 400 are substantially identical in materials and operation as the components of the large planter 300 as described above, except that the shape and size of the small planter 400 is different which is described in greater detail below. For clarity in the ensuing descriptions, numeral references of like elements of the large planter 300 are similar, but are in the 400 series for the illustrated embodiment of FIGS. 13-18 for the small planter 400, and in the 500 series for the illustrated embodiment of FIGS. 16-18 for the medium planter, which is only shown in assembly view for illustration purposes of further embodiments of the present disclosure.

The small planter 400 is illustrated as composed of a planter housing 420, a top cover 410, a water inlet port 404, and water outlet ports 402 and 408. As before, the inlet and outlet ports are labeled for illustration purposes only, and in other embodiments can be reversed while still performing the same functions. As shown in FIG. 15, the small planter 400 includes a distribution trough 406 which contains rainwater supplied by the rainwater collector 100 or the rainwater collector with bench attachment 200. The distribution trough 406 includes the aforementioned water ports 402, 404, and 408. The wicking devices are not shown for clarity. If the planter has no other connection, the ports 402 and 408 are suitably capped off as to not drain the rainwater out of the distribution trough 406.

The small planter 400 includes an intermediate support shelf 422 containing one or more baskets 434. In one embodiment, the basket 434 is configured to hold silica stone 460 (see FIG. 18) for water retention and to facilitate drainage of excess rainwater into the distribution trough 406. In other embodiments, any suitable device is used to allow drainage of the system. In the illustrated embodiment in FIG. 15, the small planter 400 is shown with seven baskets 434; however, in other embodiments, the small planter 400 contains any number of baskets suitable for the application and selected plant species.

Figure 16:
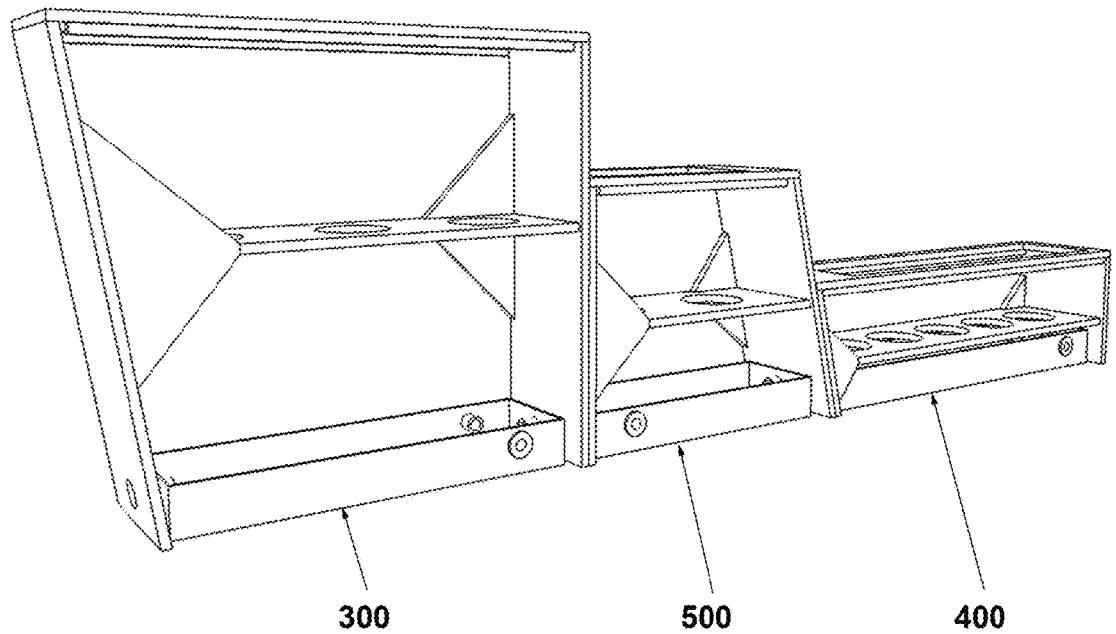
FIG. 16 is a cross-sectional front, side perspective view of the planter of FIG. 8, the planter of FIG. 13, and a planter formed in accordance with another embodiment of the present disclosure.
Figure 17:
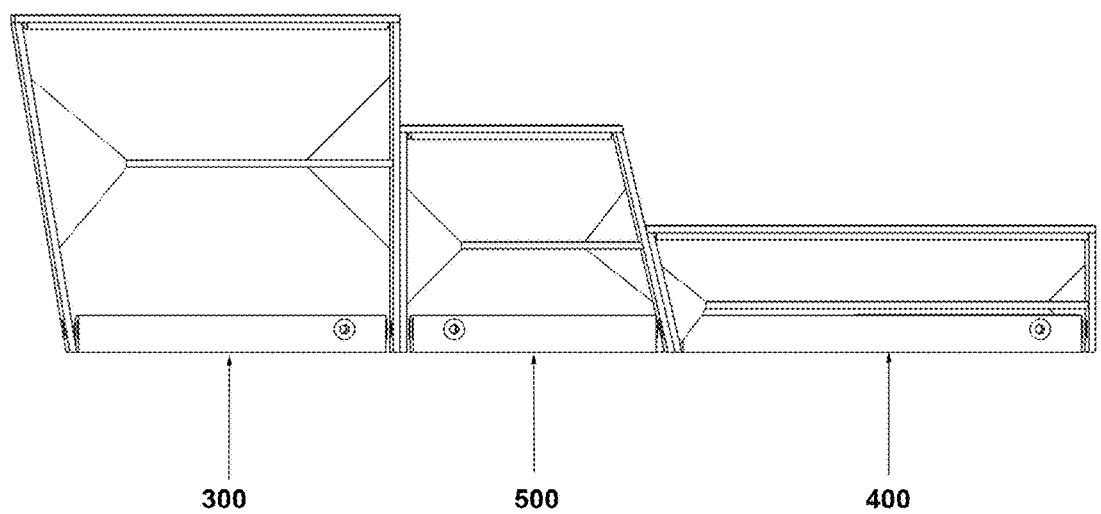
FIG. 17 is a cross-sectional side elevation view of the planter of FIG. 8, the planter of FIG. 13, and the planter of FIG. 16.
Figure 18:
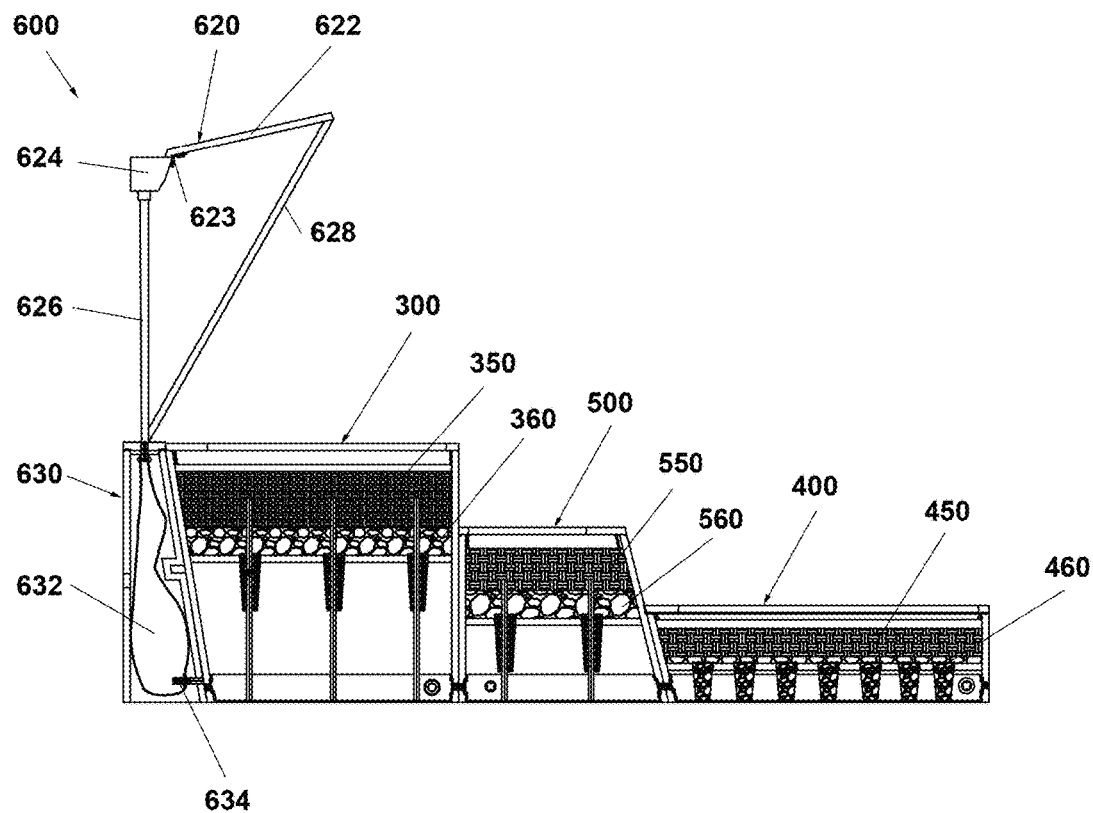
FIG. 18 is a cross-sectional side elevation view showing the rainwater collector of FIG. 2, the planter of FIG. 8, the planter of FIG. 13, and the planter of FIG. 16.

Now referring to FIGS. 16 through 18, a representative modular assembly configuration of various planter embodiments is shown. The modular assembly configuration contains the large planter 300, the small planter 400, and a medium planter 500. In some embodiments, sides of the planters 300, 400, and 500 are shaped such that they correspond to shapes of adjacent planters to nest closely. In this regard, the large planter 300 may have a side with an angle that is positive from the vertical direction and the adjacent planter side has the same angle in the negative from the vertical direction such that the angles align and the planters can be places closely together.

In some embodiments, the large planter 300, the small planter 400, and the medium planter 500 of the modular garden system are configured to be in direct fluid communication with at least one of the rainwater collector 100 or the rainwater collector with bench attachment 200 (see FIG. 18). In other embodiments, the planters are configured to fluidly connect only to another planter, which is fluidly connected to one of the collector devices. In this regard, the large planter 300 is in direct fluid communication with the water storage container 632 of a rainwater collector 600. Likewise, the medium planter 500 is in direct fluid communication with the large planter 300 and distributes water to the small planter 400.

Figure 19:
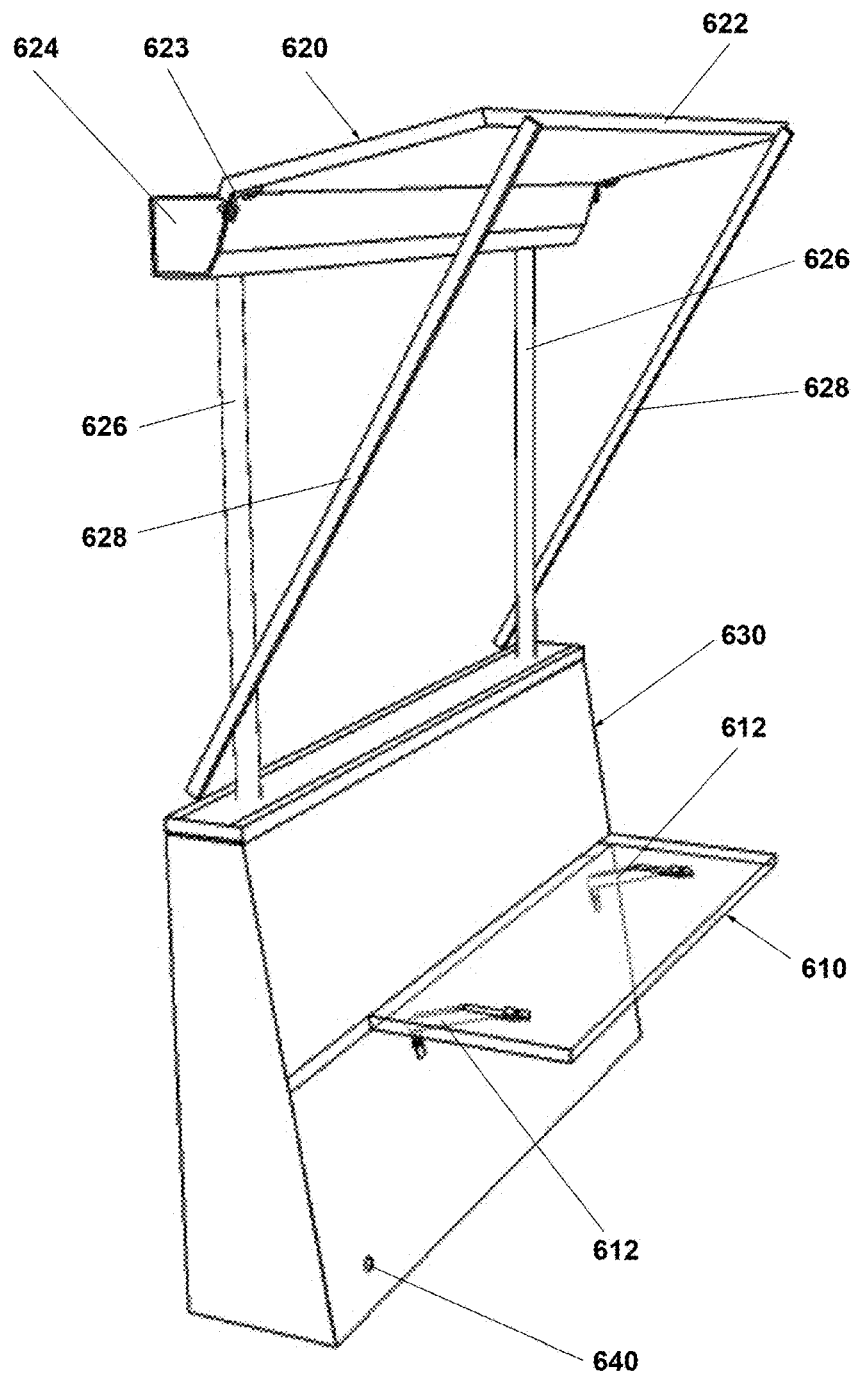
FIG. 19 is an isometric view of a rainwater collector with a bench attachment formed in accordance with another embodiment of the present disclosure.

Referring now to FIGS. 18 and 19, an additional embodiment of a rainwater collector 600 is shown. The rainwater collector 600 is substantially similar to the rainwater collector 100 except that is has a reversed rainwater collection tray 604 of a rainwater collection assembly 620 to provide deflection of rainwater such that the seated user is not exposed to the rain. Likewise, the rainwater collection tray 604 can provide shade from sunlight for the seated user.

The rainwater collector 600 includes a gutter 624 for gathering and distributing the rainwater, a gutter downtube 626, and a support structure 630. The gutter downtube 626 feeds rainwater into a storage tank 632 and distributes water to the planters 300, 400, and 500 through a connector tube 634. The collection tray 604 is mounted to the gutter with a bracket 623. As before, in embodiments of the present disclosure, the bracket 623 can be manufactured with a specific angle or adjustable to any angle suitable for the collection tray 604. In some embodiments, the collection tray 622 has further support members 628. In other embodiments, the support members 628 are omitted. In some embodiments, the rainwater collector 600 further includes a bench assembly 610 configured to support a seated user. The bench assembly 610 includes a bench 614 and bench supports 612.

Figure 20:
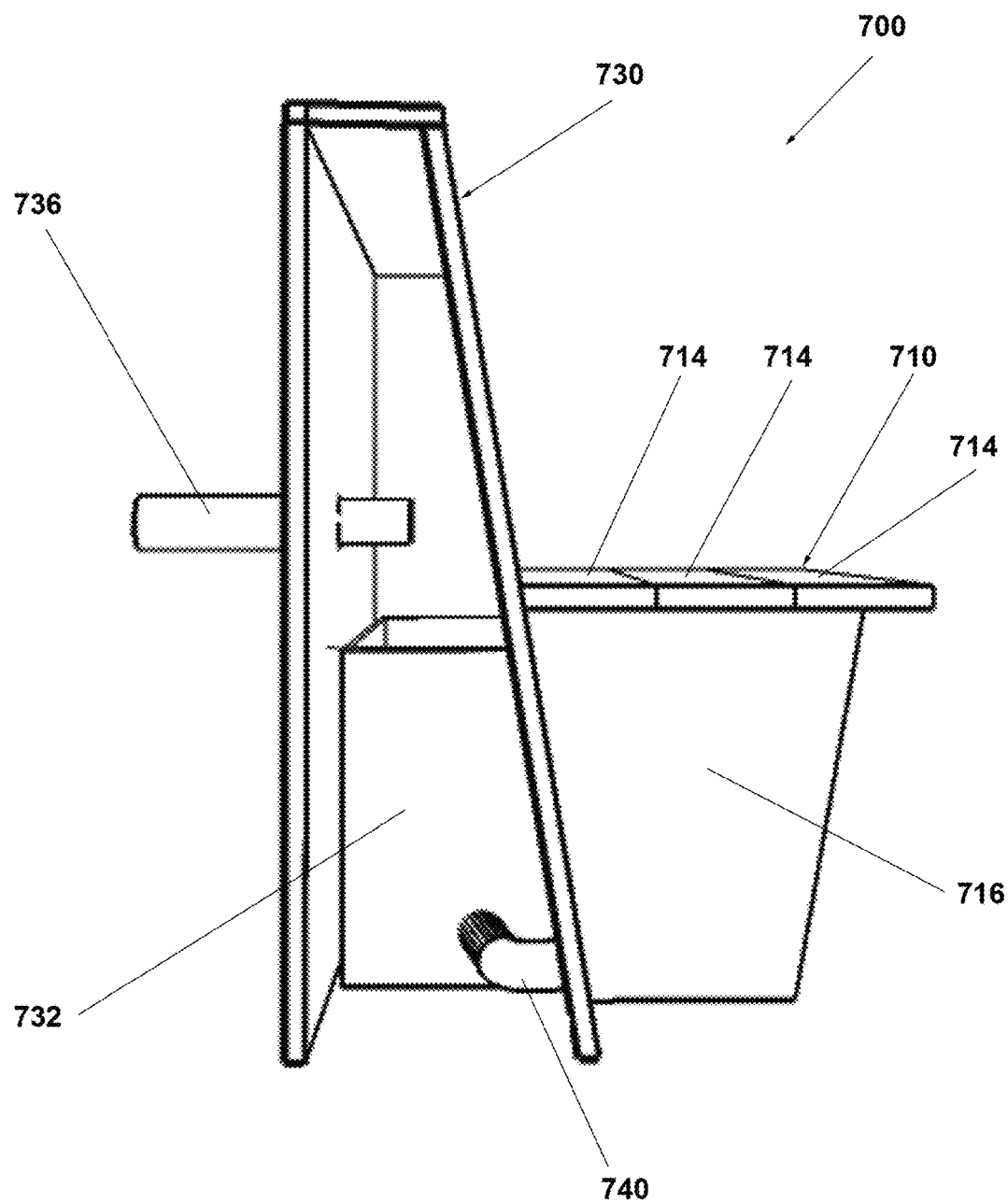
FIG. 20 is a cross-sectional side perspective view of a rainwater storage structure formed in accordance with another embodiment of the present disclosure.
Figure 21:
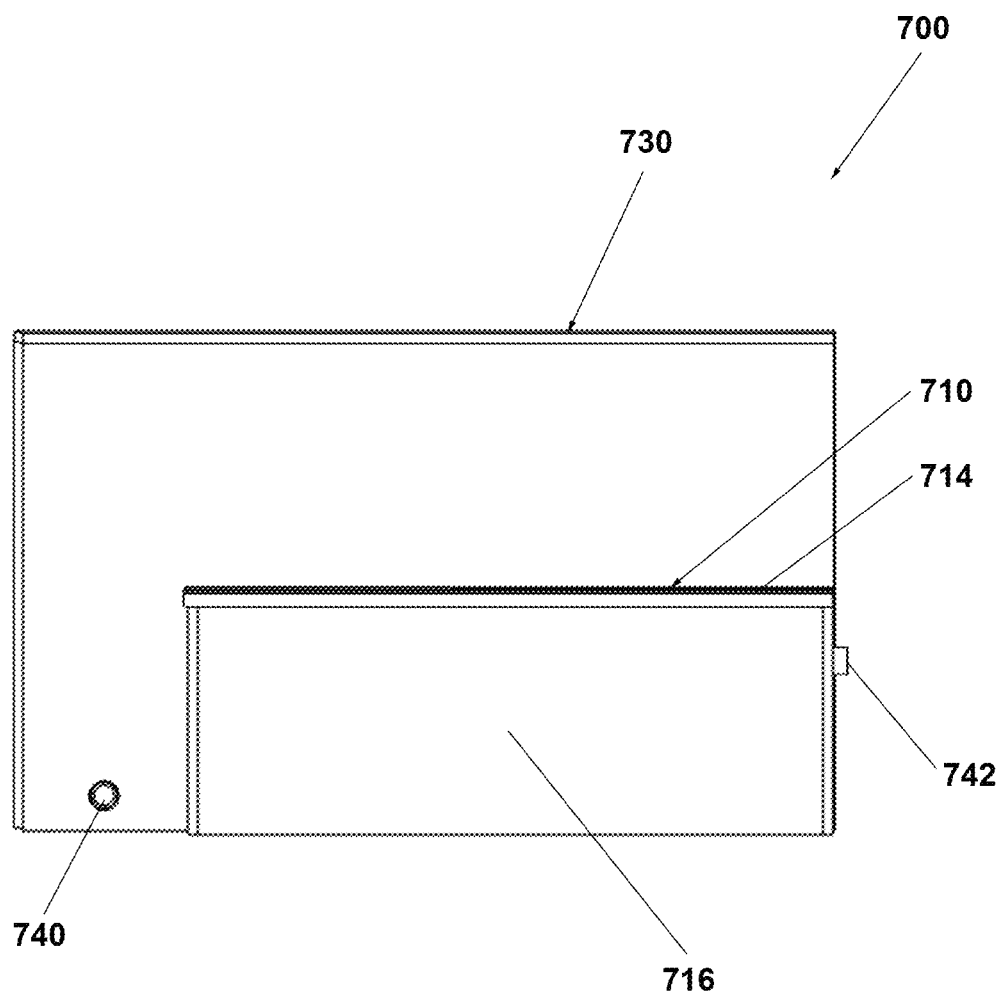
FIG. 21 is a front elevation view of the rainwater storage structure of FIG. 20.
Figure 22:
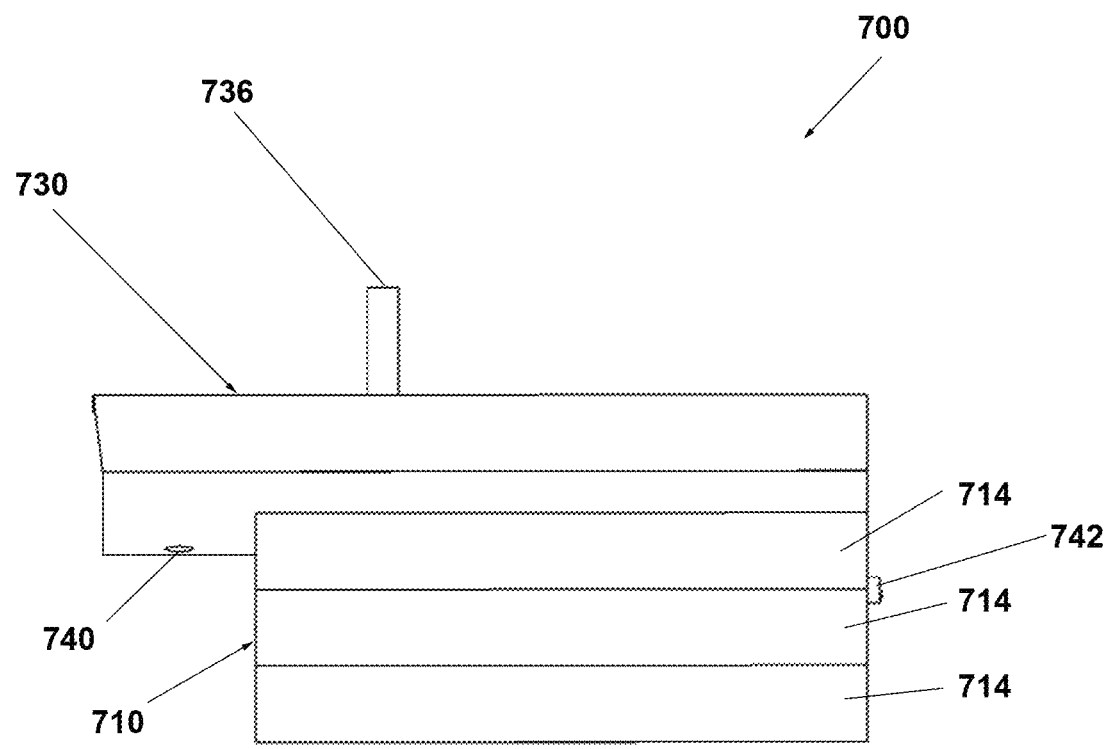
FIG. 22 is a top view of the rainwater storage structure of FIG. 20.

Referring now to FIGS. 20 through 22, an additional embodiment of a rainwater collector structure 700 is shown. The rainwater collection assembly is omitted for clarity. The rainwater collector structure 700 is substantially similar to the rainwater collector with bench attachment 200 except that is has a different rainwater storage tank 732 of a support structure 730 to provide containment of rainwater.

The rainwater collector structure 700 includes the support structure 730. The rainwater feeds into the storage tank 732 to distribute water to the planters 300, 400, and 500 through a connector tube 740. The rainwater collector structure 700 further includes a bench assembly 710 configured to support a seated user. The bench assembly 710 includes a bench consisting of a plurality of slats 714 of wood, plastic, or metal. The bench assembly 710 is supported by the bench base 716.

The rainwater collector structure 700 includes a water inlet 736 (see FIG. 22) and an additional water inlet 742 which allows the storage tank 732 to be filled using either a rainwater collection assembly (not shown; as described above), or connections from a separate component in the modular garden system. In some embodiments, a separate water barrel (not shown) is used to provide water to the system. The barrel can be suitably used during long periods without consistent rainfall.

Figure 23:
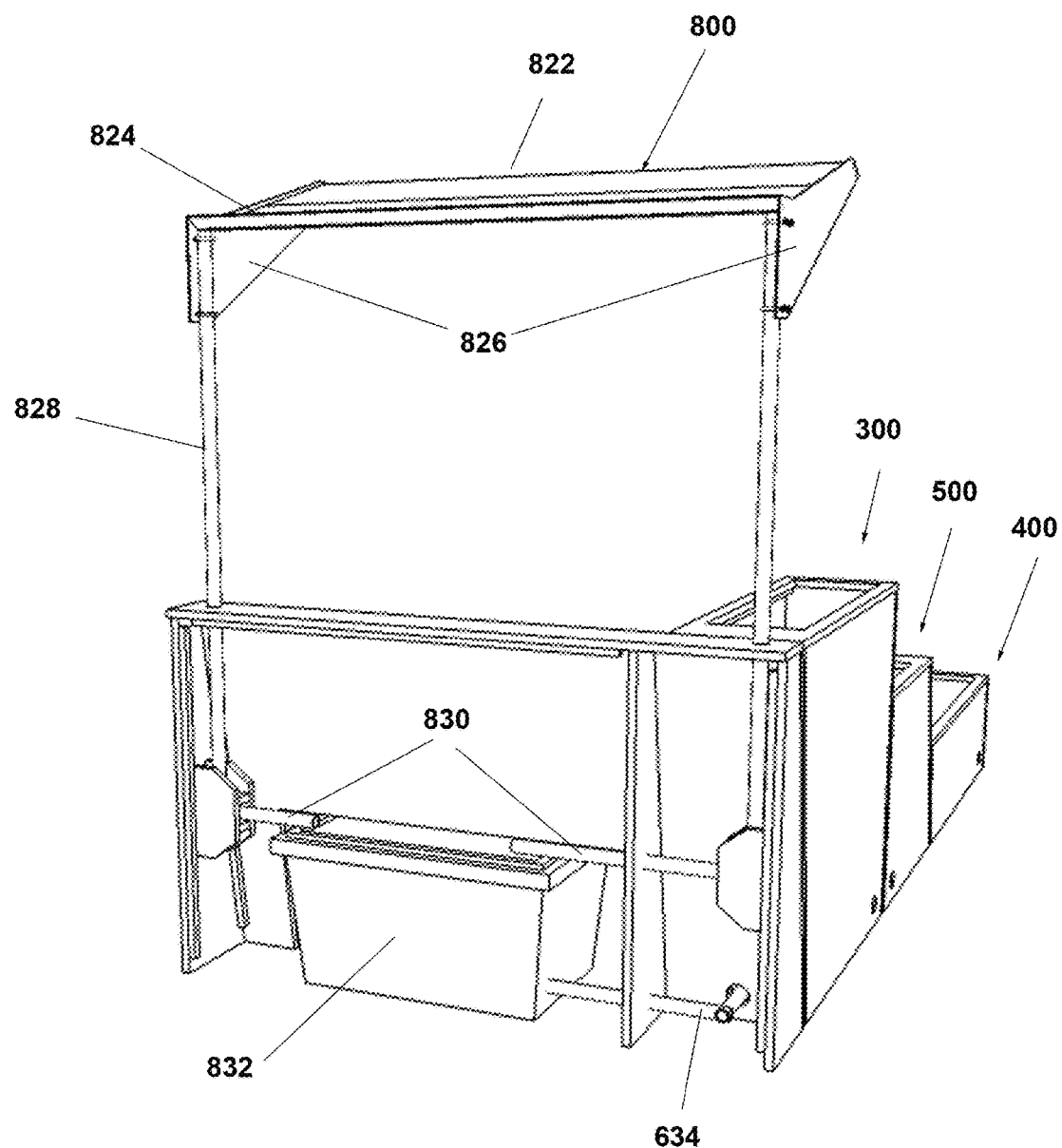
FIG. 23 is a isometric view of another embodiment of a rainwater collector in accordance with another embodiment of the present disclosure.

Referring not to FIG. 23, an additional embodiment of a rainwater collector 600 is shown. The rainwater collector is substantially similar to the rainwater collector illustrated in FIG. 19. The embodiment of the rainwater differs from the previous embodiment by adding side baffles 826 for rain protection and structural support of the collection tray 822. The gutter downtube 828 feeds water into the side tube 830 and into the storage tank 832. The gutter downtube 828 also acts as structural support of rainwater collection assembly 820 in this embodiment. The water is distributed through the storage tank 832 through the connector tube 632 and into the trays of planters 300, 400, and 500.

In some embodiments, the components of the modular garden system are configured to be flat packaged (or "flat-packable") for shipping. The term "flat-packable" in this context refers to a piece of furniture or other equipment that is sold in pieces packed flat in a box for easy transport and is assembled by the buyer.

A method of modular gardening, using a modular garden system as described above includes: determining habitat requirements based on the criteria of available space, exposure to sunlight, humidity, temperature, and/or rainfall; selecting one or more plant species appropriate for the habitat requirements; selecting a growing medium based upon the habitat requirements and selected plant species; mounting the rainwater collector 100, 200, or 600 such that the collection trays 104, 222, or 622 are positioned to collect rainwater and the gutters 102, 224, or 624 gather the rainwater for distribution to water storage containers 232 or 732; fluidly connecting the planters 300, 400, or 500 to the water storage containers 232 or 732 such that the distribution trough 306, 406, or 506 (not shown) in the planters 300, 400, or 500 are filled with collected rainwater; and planting the selected plant species in the planters 300, 400, or 500 filled with the growing medium 350, 450, or 550, respectively, wherein the rainwater is distributed to the growing medium 350, 450, or 550, respectively, by the wicking devices 332, 432 (not shown), or 532 (not shown), respecitvely, thereby providing rainwater to the plant species. The method may further include fluidly connecting a second planter 300, 400, or 500 to an outlet of the distribution trough 306, 406, or 506 such that rainwater is distributed to the second planter 300, 400, or 500.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A modular garden system, comprising:
   a rainwater collection device, comprising:
   a tray for collecting rainwater; and
   a gutter configured to gather and distribute rainwater from the tray;
   a support structure connected to the rainwater collection device, the support structure comprising a water storage container fluidly connected to the gutter, the support structure having a nesting surface disposed at a first angle from a vertical plane, the first angle greater than 0° from the vertical plane, wherein the tray, the gutter, and the support structure together form a unitary self-supporting structure; and a first planter, comprising:
  a first housing having an inlet surface disposed at the first angle such that the inlet surface of the first housing and the nesting surface of the support structure continuously abut, and an outlet surface aligned with the vertical plane;
  a first distribution trough having a first inlet and a first outlet, the first inlet fluidly connected to the water storage container; and
  a first wicking device in fluid communication with the first distribution trough, the first wicking device configured to draw and distribute rainwater from the first distribution trough to growing medium in the first planter; and a second planter, comprising:
  a second housing having an inlet surface aligned with the vertical plane such that the inlet surface of the second housing and the outlet surface of the first housing continuously abut;
  a second distribution trough having a second inlet fluidly connected to the first outlet of the first planter; and
  a second wicking device in fluid communication with the second distribution trough, the second wicking device configured to draw and distribute rainwater from the second distribution trough to growing medium in the second planter.

2. The modular garden system of claim 1, wherein the first planter further comprises an intermediate support shelf mounted above the first distribution trough, and a basket supported by the intermediate support shelf, wherein the first wicking device passes upward through the basket.

3. The modular garden system of claim 2, wherein the basket in the first planter is filled with silica stone to allow rainwater to be retained in the basket and allow excess rainwater to drain into the first distribution trough.

4. The modular garden system of claim 1, wherein the first wicking device is formed from a hydrophilic material.

5. The modular garden system of claim 4, wherein the hydrophilic material is selected from the group consisting of cotton, nylon, polyester, open celled foam, tricot, rayon, polypropylene, thermoplastic polymers, and synthetic fibers.

6. The modular garden system of claim 4, wherein the first wicking device comprises an internal support wire configured to allow the first wicking device to be formed in a position and maintain said position.

7. The modular garden system of claim 1, wherein the support structure further comprises a slot in the nesting surface configured to interface with a bench projecting laterally from a side of the support structure, wherein the bench is configured to support a user in a seated position.

8. The modular garden system of claim 7, wherein the tray of the rainwater collection device is configured to cover at least a portion of the bench for shielding the user from rain.

9. The modular garden system of claim 1, wherein the second housing of the second planter has an outlet surface disposed at a second angle from a vertical plane, the second angle greater than 0° and less than or equal to 115° from the vertical plane.

10. The modular garden system of claim 9, further comprising a third planter having a third housing having an inlet surface disposed at the second angle such that the inlet surface of the third housing and the outlet surface of the second housing continuously abut, and a third distribution trough having a third inlet fluidly connected to the second outlet of the second planter.

11. The modular garden system of claim 10, wherein the first housing is taller in height than the second housing, and wherein the second housing is taller in height than the third housing.

12. The modular garden system of claim 1, wherein the water storage container is fluidly connected to a rainwater barrel for further rainwater storage.

13. The modular garden system of claim 1, wherein the tray of the rainwater collection device is mounted at an angle of between about 1° and 15° from horizontal such that rainwater flows under gravity into the gutter.

14. The modular garden system of claim 1, wherein the modular garden system is configured to be flat packaged for shipping.

15. The modular garden system of claim 1, wherein the growing medium is selected from the group consisting of clay, vermiculite, cocopeat, and compost.

16. The modular garden system of claim 1, wherein the growing medium comprises between 10% and 30% clay; between 30% and 50% vermiculite; between 20% and 40% cocopeat; and compost.

17. The modular garden system of claim 1, wherein the growing medium comprises 20% fine grade expanded clay; 40% vermiculite; 30% cocopeat; and 10% leaf mulch compost.

18. A method of modular gardening, using a modular garden system of claim 1, the method comprising:
  determining habitat requirements based on the criteria of available space, exposure to sunlight, humidity, temperature, or rainfall;
  selecting one or more plant species appropriate for the habitat requirements;
  selecting a growing medium based upon the habitat requirements and selected one or more species;
  mounting the rainwater collection device such that the tray is positioned to collect rainwater and the gutter gathers the rainwater for distribution to the water storage container;
  fluidly connecting the first planter to the water storage container such that the first distribution trough in the first planter is filled with the collected rainwater; and
  planting the selected one or more species in the first planter filled with the growing medium, wherein the rainwater is distributed to the growing medium by the first wicking device, thereby providing rainwater to the selected one or more plant species.

19. The method according to claim 18, further comprising fluidly connecting the second inlet of the second distribution trough to the first outlet of the first distribution trough such that the rainwater is distributed to the second planter.

* * * * *